Oct. 19, 1965 K. D. POWELL ETAL 3,213,393

CAVITY DEVICE

Filed May 3, 1963

WITNESSES
Theodore F. Nrobel
James T. Young

INVENTORS
Walter R. Hayter, Jr.
and K. Dean Powell
BY
ATTORNEY

United States Patent Office 3,213,393
Patented Oct. 19, 1965

3,213,393
CAVITY DEVICE
Kenneth Dean Powell, Horseheads, and Walter R. Hayter, Jr., Elmira, N.Y., assignors to Westinghouse Electric Corporation, East Pittsburgh, Pa., a corporation of Pennsylvania
Filed May 3, 1963, Ser. No. 277,948
13 Claims. (Cl. 333—83)

This invention relates to cavity resonators and more particularly to those resonators designed to operate with at least two degenerate modes. This type of cavity is more commonly referred to in the art as a dual-mode cavity.

The particular device described herein is a trimmable fixed frequency dual-mode type cavity. The cavity is designed to operate at fixed frequencies as a frequency determining device and to provide a smooth, balanced discriminator curve when operated with matched detectors.

A typical circuit employing the cavity resonator as a frequency sensing element is illustrated in FIG. 4. In this circuit, the cavity resonator provides a zero output signal at the desired operating frequency of the klystron. Each of the outputs from the cavity resonator sees, essentially, a separate cavity. This is because of the dual-mode cavity. The dual-mode cavity provides, in effect, two electrical cavities while in reality only one physical cavity is provided. The result is that excellent symmetry between the outputs is obtained from the cavity resonator. In the particular circuit shown in FIG. 4, the cavity resonator is utilized for stabilizing the operating frequency of a klystron tube. A portion of the output from the klystron is coupled by means of the directional coupler to a discriminator cavity. The mode coupled into the discriminator cavity is split into a degenerate form. This may be accomplished by deforming a cylinder having a circular cross section to provide an elliptical cross section. The field configuration of an elliptical cavity can be simulated by placing asymmetry into a circular cavity to thereby decrease the cross section in one plane. This plane may be referred to as a minor axis of the tube while the other axis perpendicular thereto would be considered to be major axis so as to thereby simulate an elliptical cavity. The two modes of oscillation taking place in the cavity resonator are preferably separated, as to frequency, by a relatively small amount. In the particular application in which the center operating frequency is of about 35 gigacycles, the resonant frequencies of the two modes may be separated by only about 10 megacycles. Energy taken from the two outputs (each mode of oscillation) is coupled into a differential amplifier. By proper adjustment of the differential amplifier, it can be arranged that for a predetermined designed frequency of the klystron between the two resonant frequencies of the two modes of oscillation of the resonator, no correction will be applied to the reflector of the reflex klystron. If the frequency of the klystron varies from the desired value, the amplitude of one mode of oscillation will increase while that of the other mode of oscillation will decrease. Accordingly, the reflector of the klystron will have its voltage varied in a positive or negative direction from its standard voltage with the resulting tendency to retune the klystron to restore its frequency toward the predetermined value. Thus, any deviation in the klystron oscillator from its desired operating frequency results in a correction voltage applied to the reflector of the klystron. In this way, the klystron may be maintained at a fixed frequency.

As indicated above, the field configuration of an elliptical cavity can be simulated by placing asymmetry into a cylindrical cavity so as to, in effect, decrease the cross section in one plane. This asymmetry is normally achieved by the placing of a physical member within the cavity. However, in order that the two degenerate modes may be tuned with respect to one another, the position of the inserted member must be variable. It is also necessary in devices of this nature that some means be provided for tuning the center frequency of the device. In the prior art the most common method of providing this tuning, both of the center frequency and of the two degenerate modes has been by placing one or more screws such that they project into the cavity itself. Normally, separate screws are utilized for tuning the center frequency and the two degenerate modes. These screws are made adjustable in order that a degree of extension into the cavity may be varied. In lower frequency devices, for example devices operative at about 9,000 megacycles, this method of tuning is quite satisfactory. At higher frequencies, for example 35 gigacycles and above, it has been found that a screw protruding into the cavity is very lossy and a low Q cavity results. One reason for this problem is that at higher frequency the cavity becomes quite small. For example, the dimensions of a cavity at 35 gigacycles are such that the diameter of the cavity is approximately 0.336 inch and the height of the cavity is approximately 0.414 inch. With these dimensions of the cavity, the practical lower limit in the size that a screw can be made is reached. The ratio of the screw to the cavity surface becomes increasingly greater, and consequently the amount of current interrupted by the high resistance joint becomes larger.

A second method of tuning, especially the tuning of the two degenerate modes, is described in application Serial No. 92,540, filed March 1, 1961, U.S. Patent 3,170,129, issued February 16, 1965 and assigned to the assignee of the present invention. In that patent, tuning is achieved through the placement of a waveguide beyond cutoff in the walls of the cavity. A tuning screw is disposed within the waveguide but does not extend into the cavity itself. The waveguide beyond cutoff adds a small amount of volume to one plane of the cavity and hence produces the desired asymmetry. Inasmuch as the waveguide is dimensioned beyond cutoff, only small amounts of energy are propagated into the waveguide and tuning is achieved by adjusting the tuning screw into this small field. While this latter method of tuning is quite satisfactory from a loss standpoint, it does suffer from the disadvantage that the range over which tuning may be accomplished is rather small. For a more complete understanding of this method involving a waveguide beyond cutoff, reference is made to the above cited patent.

It is, therefore, an object of this invention to provide an improved means for tuning cavity resonators.

A further object is to provide an improved dual-mode cavity resonator in which tuning of both the center frequency and the two degenerate modes is accomplished by means of a movable wall portion.

Another object of this invention is to provide an improved cavity resonator of the dual-mode type in which a single element provides both center frequency tuning and tuning of the two degenerate modes.

A still further object of the invention is to provide a cavity resonator with temperature compensating means.

A still further object of this invention is to provide a cavity resonator with a high Q.

A still further object of the present invention is to provide a dual-mode type cavity resonator having means for tuning the center frequency and the two degenerate modes and in which said means are capable of tuning these over a considerable bandwidth.

Stated briefly, the present invention provides a cavity resonator having a plurality of walls defining a cavity. One wall of the cavity is in the form of a flexible diaphragm. Through suitable means, the diaphragm is given two types of motion. The first of these types is a motion along the length of the cavity in planes which are substantially perpendicular to the axis of the cavity. The second type of movement given the diaphragm is a tilting of the diaphragm so that its front surface lies in a plane or planes which is not perpendicular to the longitudinal axis of the cavity. Additionally, the present invention provides for temperature compensation through differential coefficients of expansion between the material of the cavity body and an actuating means of the diaphragm.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which.

Figure 1:
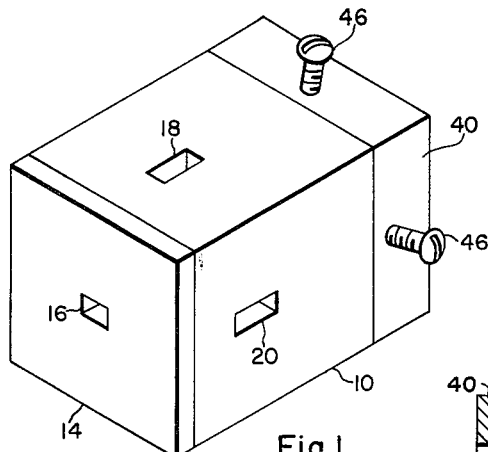
FIGURE 1 is an isometric view of the exterior of a cavity resonator embodying the present invention.
Figure 2:
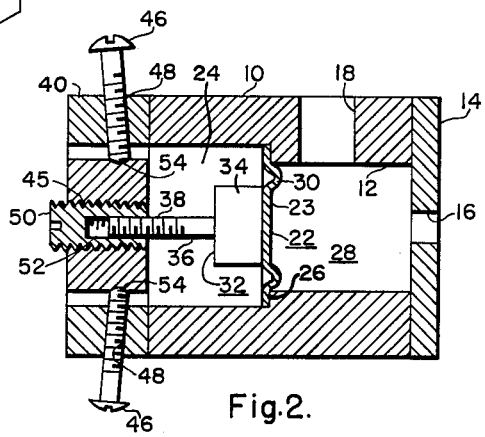
FIG. 2 is a side elevational view, in section, taken through the center of the device of FIG. 1.
Figure 3:
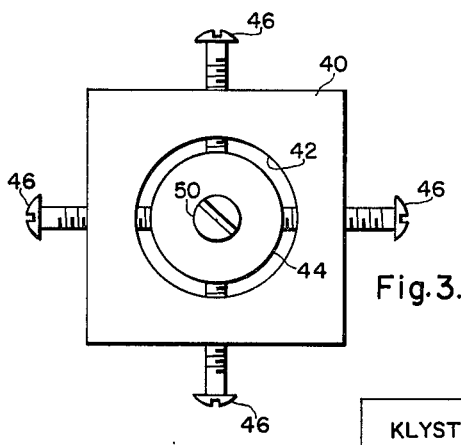
FIG. 3 is a rear elevational view of the device of FIG. 1.
Figure 4:
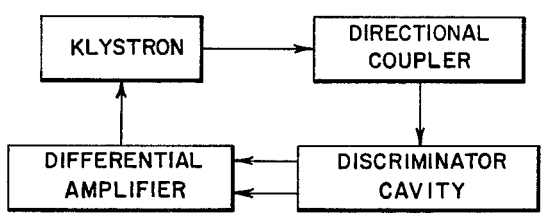
FIG. 4 is a schematic illustration of a particular application of the cavity resonator illustrated herein.

With reference now to the drawings, there is shown a rectangular body 10 which is of a suitable material such as Invar. A cylindrical bore or opening 12 is provided within the body 10. The opening 12 is closed at one end by means of a cover or end plate 14, which may also be Invar, which is provided with a centrally disposed aperture 16, serving, in the present embodiment, as an energy input means. Two additional apertures 18 and 20 positioned in quadrature and extending through the body 10 serve as output means in a manner well known in the art. At the opposite end of the cylindrical opening 12 from that at which is positioned the end plate 14 there is provided a diaphragm member 22 which may be of copper. The wall of the cylindrical opening 12, the end plate 14, and the diaphragm 22 define a cavity resonator 28.

In the present embodiment, the diaphragm 22 is disposed within a second cylindrical opening or bore 24 within the body 10. The diameter of the opening 24 is illustrated as being greater than that of the opening 12 in order to provide a lip portion 26 against which the diaphragm 22 may seat. The diaphragm may be secured to the body 10 by any suitable means, for example, brazing in the region of the lip portion 26. It is of course obvious that the opening 24 need not be cylindrical in shape but can take on any desired form and it is equally obvious that other methods could be utilized to mount the diaphragm 22 on the end of the opening 12.

Although it has not been so illustrated nor described, if it is desired to operate the device as a vacuum type, suitable microwave transmissive windows could be placed in the apertures 16, 18 and 20, suitable vacuum seals utilized to secure the end plate 14 and the diaphragm 22 to the body 10, and the device evacuated—all in a manner well known in the art.

The diaphragm 22, as shown, is inclusive of a rib portion 30 and a center, substantially planar portion 23. Center frequency tuning of the cavity resonator 28 is achieved by perturbing the field symmetrically with respect to the degenerate modes. In the illustrated embodiment this may be achieved by moving the center portion 23 of the diaphragm 22 axially along the length of the opening 12 so that the center or flat portion 23 of the diaphragm 22 lies in planes which are substantially perpendicular to the axis of the opening 12. In order that this movement might be readily achieved, the diaphragm is preferably provided with a circular rib 30 which is positioned adjacent the wall of the bore 12. Diaphragms of this nature are well known in the art and further discussion is not deemed necessary herein. Secured to the back surface of the diaphragm 22 is an actuating or strut member indicated generally as 32. As illustrated, the strut member 32 is comprised of an enlarged portion 34 and a reduced or shaft portion 36, the outer end of which is provided with a threaded portion 38. The enlarged portion 34 of the strut 32 preferably has a diameter corresponding to the central portion 23 of the diaphragm 22 in order that this portion of the diaphragm may remain substantially planar when its movement is occasioned by the movement of the strut 32. While the material of the strut 32 is not critical, as will be more fully explained later temperature compensation of the cavity can be achieved by the proper selection of material for the strut.

Secured to the body 10, by suitable means such as brazing, at the opposite end from the end plate 14 is a second end plate 40. The end plate 40 may be of a suitable material such as Invar, and is provided with a centrally extending aperture 42. Disposed within the aperture 42 there is provided a collar or apertured disk member 44 which is supported within the aperture 42 by means of a plurality of screws 46 extending through a corresponding number of threaded holes 48 located within the end plate 40. In the illustrated embodiment, four such screws 46, positioned in quadrature with respect to the collar 44, are utilized. While a lesser number of screws 46 cooperating with fixed contact points could be utilized, as will be more fully understood as the description proceeds, if motion of the collar 44 in all directions is desired four such screws are preferred. The collar 44 is provided with a centrally extending aperture 45 which is internally threaded to mate with an externally threaded lag screw 50 which is disposed within this aperture. The lag screw 50 in turn is provided with a centrally extending internally threaded bore 52 for a portion of its length, the threads of which are made to correspond to the threads 38 on the reduced portion 36 of the strut 32. It is readily evident that, by this particular arrangement and by the proper selection of thread pitch and direction, there may be provided a differential screw adjustment. Rotation of the lag screw 50 provides for a longitudinal movement of the strut 32 which in turn results in a physical displacement of the diaphragm 22 to provide for the center frequency tuning of the cavity 28.

The manner in which the two degenerate modes may be tuned is as follows. The screws 46 which are positioned through the end plate 40 which acts as a support and are in contact with the collar 44 may have the contacting ends thereof slightly rounded to correspond with slight depressions 54 located in the surface of the collar 44. Additionally, it has been found advantageous to position these screws so that they do not approach the collar 44 at an angle of 90° but are instead slightly displaced therefrom. Thus, when any one particular screw 36 is adjusted radially with respect to the collar 44, this adjustment will result in a slight tilting of the collar 44 from its illustrated position which is substantially perpendicular to the longitudinal axis of the body 10. This tilting motion will be transmitted through the strut 32 to the diaphragm 22 and will of course result in a corresponding tilting motion of that latter member. This tilting of the diaphragm results in asymmetries being introduced into the cavity 28 and hence a dual-mode operation. The asymmetries can be controlled to the degree desired and the two degenerate modes properly tuned and balanced.

Thus, it is seen that through the above described mechanism, the diaphragm is given two separate and distinct types of motion. The first of these is the one which tunes the center frequency of the cavity 28 and is along planes which are substantially perpendicular to the longitudinal axis of the cavity. The second motion described is a tilting of the diaphragm from the substantially perpendicular planes to provide the necessary balancing and tuning of the two degenerate modes.

The temperature compensation feature which was referred to above, may be explained as follows. With a rise in temperature of the body 10 and the inherent expansion occasioned thereby, the length and diameter of the centrally extending opening 12 will increase. The increase would result in a larger cavity with the resultant lowering of resonant frequency. By the proper correlation of size and coefficient of thermal expansion of the strut 32 to that of the material of the body 10 and the size of the opening 12, the cavity frequency may be maintained substantially constant. In the illustrated embodiment, this results from the fact that thermal expansion of the strut will tend to decrease the cavity length. In this embodiment having an Invar body 10, a material having a higher coefficient of thermal expansion, for example iron or copper, may be utilized.

While there have been shown and described what are considered at present to be the preferred embodiments of the invention, modifications thereto will readily occur to those skilled in the art. While the invention has been described and illustrated utilizing a differential screw tuning mechanism for center frequency tuning, it is apparent that such is not essential for the operation of the device but is merely an expediency to provide more accurate center frequency tuning. It is not desired, therefore, that the invention be limited to this specific arrangement shown and described and it is intended to cover in the appended claims all such modifications as fall within the true spirit and scope of the invention.

We claim as our invention:

1. A cavity resonator comprising a member having an opening therein, closure means for each end of said opening to define a cavity adapted to be excited simultaneously in two modes, means for coupling energy into said cavity resonator to excite two modes of oscillation therein, and means for selectively tuning said two modes of oscillation from which energy is derived through the walls of said cavity by means of two output means, said tuning means comprising a flexible diaphragm forming one of said closure means, means for effecting substantially axial motion of said diaphragm and means for tilting said diaphragm.

2. A cavity resonator comprising a member having a hollow cylindrical opening therein, closure means for each end of said openings to define a cavity adapted to be excited simultaneously in two modes, means for coupling energy of a substantially single frequency into said cavity resonator to thereby excite two modes of oscillation within said cavity, and means for selectively tuning said two modes of oscillation from which energy is derived through the walls of said cavity by means of two output means, said tuning means comprising a flexible diaphragm forming one of said closure means, means for effecting substantially axial motion of said diaphragm and means for tilting said diaphragm.

3. A cavity resonator comprising a member having a hollow opening therein, closure means for each end of said openings to define a cavity adapted to be excited simultaneously in two modes, one of said closure means inclusive of a flexible diaphragm, means for coupling energy of a substantially single frequency into said cavity to thereby excite two modes of oscillation within said cavity, and means for selectively tuning said two modes of oscillation from which energy is derived through the walls of said cavity by means of two output means, said tuning means including said flexible diaphragm, means for effecting substantially axial motion of said diaphragm to effect the center tuning of said cavity resonator and means for tilting said diaphragm to effect the balance and tuning of said two different modes of oscillation.

4. A cavity resonator comprising a member having a hollow cylindrical opening therein, closure means for each end of said opening to define a cavity adapted to be excited simultaneously in two modes, means for coupling energy into said cavity resonator to excite two modes of oscillation within said cavity, and means for selectively tuning said modes of oscillation from which energy is derived through the walls of said cavity by means of two output means, said tuning means comprising a flexible diaphragm forming one of said closure means, means for moving said diaphragm through a series of planes substantially perpendicular to the longitudinal axis of said opening and means for tilting said diaphragm from said planes.

5. A cavity resonator comprising a member having a hollow opening therein, closure means for each end of said opening to define a cavity adapted to be excited simultaneously in two modes, means for coupling energy of a substantially single frequency into said cavity to thereby excite the modes of oscillation within said cavity, and means for selectively tuning said modes of oscillation from which energy is derived through the walls of said cavity by means of two output means, said tuning means comprising a flexible diaphragm forming one of said closure means, means for moving said diaphragm through a series of planes substantially perpendicular to the longitudinal axis of said opening and means for transversely displacing said diaphragm from said planes.

6. A cavity resonator comprising a member having an opening therein, closure means for each end of said opening to define a cavity adapted to be excited simultaneously in two modes, one of said closure means inclusive of a flexible diaphragm, means for coupling energy into said cavity resonator to excite said two modes of oscillation within said cavity, and means for selectively tuning said modes of oscillation from which energy is derived through the walls of said cavity by means of two output means, said tuning means including said flexible diaphragm, means of moving said diaphragm through a series of planes substantially perpendicular to the longitudinal axis of said opening and means for transversely displacing said diaphragm from said planes.

7. A cavity resonator comprising a member having an opening therein, closure means for each end of said opening to define a cavity adapted to be excited simultaneously in two modes, means for coupling energy into said cavity resonator to excite said two modes of oscillation within said cavity, and means for selectively tuning said modes of oscillation from which energy is derived through the walls of said cavity by means of two output means, said tuning means comprising a flexible diaphragm forming one of said closure means, means for moving said diaphragm to a suitable plane substantially perpendicular to the longitudinal axis of said opening and means for moving said diaphragm in a direction which is skewed with respect to the longitudinal axis of said cavity.

8. A cavity resonator comprising a member having a hollow cylindrical opening therein, closure means for each end of said opening to define a cavity adapted to be excited simultaneously in two modes, one of said closure means including a flexible diaphragm, means for coupling energy of a substantially single frequency into said cavity to excite two modes of oscillation within said cavity, and means for selectively tuning said modes of oscillation from which energy is derived through the walls of said cavity by means of two output means, said tuning means including said flexible diaphragm, screw means for moving said diaphragm to a suitable plane substantially perpendicular to the longitudinal axis of said opening and means for moving said diaphragm in a direction which is skewed with respect to the longitudinal axis of said cavity.

9. A cavity resonator comprising a plurality of walls defining a cavity, means for coupling energy into and out of said cavity, tuning means for said cavity comprising a flexible diaphragm included within one of said walls, and means for moving said diaphragm both along the longitudinal axis of said cavity and in a direction transverse to a plane perpendicular to said longitudinal axis.

10. A cavity resonator comprising a plurality of walls defining a cavity, means for coupling energy into and out of said cavity, tuning means for said cavity comprising a flexible diaphragm forming one of said walls, means for moving said diaphragm both along and substantially perpendicular to the longitudinal axis of said cavity and means for tilting said diaphragm with respect to the longitudinal axis of said cavity.

11. A cavity resonator comprising a plurality of walls defining a cavity, means for coupling energy into and out of said cavity, tuning means for said cavity comprising a flexible diaphragm forming one of said walls, means for moving said diaphragm through a series of planes substantially perpendicular to the longitudinal axis of said cavity and means for transversely displacing said diaphragm from said planes.

12. A cavity resonator comprising a body member having a hollow cylindrical opening therein, a closure means at each end of said opening to define a cavity adapted to be excited simultaneously in two modes, means for coupling energy into and out of said cavity, means for selectively tuning said modes of oscillation, said tuning means comprising a flexible diaphragm included within one of said closure means, and means for distorting said diaphragm comprising elongated strut means having one end thereof operatively connected to said diaphragm, first means acting on said strut means in a direction substantially along the longitudinal axis thereof, and second means acting on said strut means acting in a direction transverse to the longitudinal axis thereof whereby said diaphragm is given motion both along said longitudinal axis and in a direction transverse thereto.

13. A cavity resonator comprising a body member having a hollow cylindrical opening therein, closure means at each end of said opening to define a cavity adapted to be excited simultaneously in two modes, means for coupling energy into and out of said cavity, means for selectively tuning said two modes of oscillation, said tuning means comprising a flexible diaphragm forming one of said end closure means, and means for distorting said diaphragm comprising an elongated strut having one end thereof secured to said diaphragm, apertured support means affixed to said body member and spaced from said diaphragm, disc means having a threaded aperture supported within the aperture of said support means, first screw means disposed within said threaded aperture and operatively connected to said strut whereby rotation of said first screw means moves said strut substantially along its longitudinal axis, and second screw means comprising a plurality of screws extending through said support means and in contact with said apertured disc, said plurality of screws serving to support said apertured disc within the aperture of said support means, said plurality of screws also serving to displace said disc and said strut transversely with respect to the longitudinal axis of said cavity.

References Cited by the Examiner
UNITED STATES PATENTS 2,502,456  4/50  Hansen et al. _____ 229—116 X

FOREIGN PATENTS 130,120  11/48  Australia.

HERMAN KARL SAALBACH, *Primary Examiner.*